United States Patent [19]

Tritter

[11] Patent Number: 4,516,107

[45] Date of Patent: May 7, 1985

[54] FUNCTION GENERATORS

[76] Inventor: Stephen D. Tritter, Fernwood La., Amherst, N.H. 03031

[21] Appl. No.: 455,238

[22] Filed: Jan. 3, 1983

[51] Int. Cl.³ .......................... H01B 0/00; G01B 7/00

[52] U.S. Cl. .......................................... 338/89; 338/91

[58] Field of Search ...................................... 338/89-92

[56] References Cited

U.S. PATENT DOCUMENTS

| | | | |
|---|---|---|---|
| 2,497,208 | 2/1950 | Coggeshall | 338/89 X |
| 2,542,478 | 2/1951 | Clark | 338/89 X |
| 2,938,185 | 5/1960 | Dill | 338/89 |
| 3,336,558 | 8/1967 | Wright | 338/89 X |
| 3,355,692 | 11/1967 | Poland | 338/89 |
| 3,478,293 | 11/1969 | Hooten, Jr. | 338/91 X |

FOREIGN PATENT DOCUMENTS

| | | | |
|---|---|---|---|
| 808852 | 5/1951 | Fed. Rep. of Germany | 338/89 |
| 824343 | 11/1959 | United Kingdom | 338/89 |
| 1252454 | 11/1971 | United Kingdom | 338/90 |

OTHER PUBLICATIONS

Johnk, *Engineering Electromagnetic Fields and Waves,* John Wiley & Sons, 1975, pp. 251-253.

Hayt, *Engineering Electromagnetics,* 3rd Ed., McGraw-Hill Book Co., ©1974, pp. 171-192.

Van Bladel, *Electromagnetic Fields,* McGraw-Hill Book Co., 1974, pp. 86-90.

*Primary Examiner*—Roy N. Envall, Jr.

*Assistant Examiner*—C. N. Sears

*Attorney, Agent, or Firm*—Schiller & Pandiscio

[57] ABSTRACT

The invention provides new potentiometer-type function generators that have (1) a resistance element having a two-dimensional contact surface with boundaries arranged so that a non-uniform voltage distribution is produced when the resistance element is electrified and (2) a contact member which is mounted so as to permit relative movement in two different directions between it and the contact surface of the resistance element.

9 Claims, 13 Drawing Figures

FUNCTION GENERATORS

This invention relates to electrical function generators and more particularly to novel two-dimensional function generators.

Function generators are useful in various applications as, for example, in providing analog control voltages in flight simulators or balance and volume controls for stereo recording and playback equipment. Potentiometers are a common type of function generator since they provide voltages which vary, linearly or non-linearly, with the movement of a contact arm on a resistance element. Conventional potentiometers are designed to be single-variable function generators (in the sense that they have only one mechanical variable, so that if the input voltage or current is fixed, the output will vary in accordance with a one-variable mathematical function) since the contact arms or wipers are movable in a single direction mode along the resistance elements. However, other single-variable potentiometer type generators are known where the contact arms moves in two directions (see U.S. Pat. Nos. 2,542,478, 3,105,215, 3,662,313, 3,478,293 and 2,497,208). Such devices may be linear or non-linear, as demonstrated by U.S. Pat. Nos. 3,336,558, 2,938,185, 3,178,566, 3,636,428, 3,325,763, 3,290,495 and 3,379,567. However, potentiometer-type two-variable function generators (i.e. those where the output varies in accordance with a two-variable mathematical function) are known which have a contact arm that is movable along the resistance element in the X and Y directions of a rectangular coordinate system. Such a two-variable function generator requires a non-uniform electric field pattern, heretofore produced by applying discrete potentials to different points in a pattern of amplitudes conforming to a prescribed function. Examples of two-variable potentiometer type function generators are disclosed in U.S. Pat. Nos. 2,938,185 and 3,355,692.

Still another form of two-variable function generator exists which uses a matrix of conductors instead of a resistance element, as demonstrated by U.S. Pat. No. 2,902,607.

A limitation of prior two-variable function generators of the type employing a contact arm movable in two directions has been the inability to accommodate a wide variety of mathematical functions with infinite resolution capability and in particular the inability to easily and reliably tailor the two-dimensional voltage distribution throughout the plane of the resistance element surface in accordance with a predetermined analog function generating capability.

Accordingly the primary object of this invention is to provide novel electrical resistance transducers designed to be used as analog function generators and adaptable to the production of functions of various types, including functions which can or cannot be easily expressed mathematically.

Another object is to provide electrical resistance transducers of the potentiometer type having a resistance element which is formed and/or electrically excited to represent a two-dimensional plane with the electric field distribution being non-uniform.

Still another object is to provide an improved two-variable analog function generator wherein the output analog signal is produced by a contact which is movable along a resistance element in two directions.

A further object is to extend the utility of potentiometers, variable resistors and the like by making them operative so that the output is a function of two mechanical inputs.

Other objects are to provide multi-variable potentiometers, phase-shifters and the like which employ molded of film-type resistor elements, are easy to connect and use, and can be used with relatively simple circuitry.

These and other objects hereinafter stated or made obvious are achieved by providing potentiometer type function generators that are characterized by resistance elements having a selected resistivity. Although a substantially uniform resistivity is most often preferred, a non-uniform resistivity may be provided for a special function design. The portions of the resistance elements which are exposed to the wiper contact may be in the form of flat disks or may be flat cards arranged as cylinders or conical members or in other shapes which may become apparent. These resistance elements and a wiper contact are mounted so as to permit relative movement therebetween in two directions. In a preferred embodiment of the invention the resistance element has short circuit and open circuit boundaries which are shaped in an appropriate fashion so as to provide the desired two-dimensional voltage distribution throughout its contact-engaged surface. In other embodiments the resistance element has two short circuit boundaries and no open circuit boundaries and is shaped so as to provide an appropriate two-dimensional voltage distribution throughout its contact-engaged surface. In this invention the short circuit boundaries are shaped to fall on the desired equipotential boundaries, while any open circuit boundaries are shaped to fall on the desired current flow boundaries.

Other features and many of the advantages of the invention are presented in the following detailed specification which is to be considered together with the accompanying drawings wherein.

In the several figures, like parts are identified by like numerals.

Figure 1:
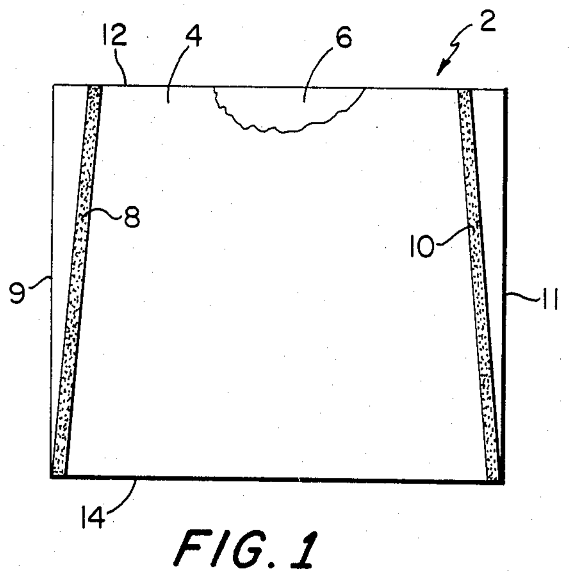
FIGS. 1 and 2 illustrate the formation of a flat sheet resistance element in accordance with this invention.

Heretofore it has been noted in Williams et al U.S. Pat. No. 3,046,510 that providing a center hole in a flat resistance card of a sine-cosine potentiometer to accommodate the operating shaft on which the wiper contact is mounted has the result of altering the voltage and current distributions over the surface of the card and distorting the sine-cosine functions originally obtainable by circular traces about the center of the card. The art has sought to correct the problem by altering the configuration of the card input terminals (Rosenthal U.S. Pat. No. 2,764,657) or by altering the configuration of the two opposite card edges transverse to the input terminal edges (Montgomery U.S. Pat. No. 2,653,206). Williams et al resort to concave and concave edges to achieve a satisfactory sine-cosine function. However, such efforts have not provided a solution with respect to providing a two-variable function generator of the type where the outut V=F(x,y).

It also is known that a uniformly resistive sheet constitutes a true function generator when the desired function satisfies Laplace's equation and constitutes an approximate function generator for other functions. As described by N. R. Scott, Analog and Digital Computer Technology, pp. 96–99, McGraw Hill (1960), the usual way of using resistance sheets for function approximation is to plot contours of constant f(x,y) on the resistive surface and then to paint over the resulting lines with a conducting silver paint. When the lines are driven by voltages proportional to the constant value f(x,y) along each line, the surface between two adjacent lines performs an electrical interpolation between the line potentials. An infinite-impedance probe, positioned by x and y input servo systems, detects the interpolated voltage at the desired point. While the technique described by Scott is accepted as a useful laboratory tool and flat resistance sheets have been used to experimentally determine appropriate solutions to various complex flow problems involving heat, fluids and magnetic fields, there has not been available a practical two-variable potentiometer-type function generator which requires only a single flat resistance sheet to generate an output varying in accordance with two variable inputs exclusive of a varying electrifying potential.

The essence of this invention is a device that uses a flat resistance sheet modified to get varying shape equipotentials and has two degrees of freedom in its mechanical input, ie., in the relative motion between the resistance element and a wiper contact, to generate an output which varies according to its mechanical input or inputs.

This means that in those embodiments of the invention comprising a cylindrically formed resistance card and a wiper contact carried by an operating shaft, the shaft is mounted so that selectively it can be rotated or linearly translated (stroked) or both in an arbitrary manner. As a result, if the wiper contact, b, is moved, the resistance between the wiper contact and one of the electrifying terminals, c, of the card will vary according to the position of the wiper contact and the design of the resistance element, as represented by the following mathematical expression:

$$R_{b,c}=R_{a,c}f_0(\theta,z)$$

where $R_{a,c}$ is the resistance of the total element between the two electrifying electrodes a and c, $R_{b,c}$ is the resistance between the wiper terminal b and the electrifying terminal c, $\theta$ and z represents the rotational and stroked positions respectively of the wiper contact as determined by rotational and translational movement of the shaft, and $f_0$ is the functional relation between $\theta$, z and $R_{b,c}$ and is essentially determined by the thickness of the layer of resistive material of the card, by the shape of the borders of the resistive material, and by the selective placement of highly conductive areas on the resistive material (also by the placement of holes in the conductive material, and by any non-uniformity of the resistivity of the resistive material). By adjustment of these parameters and by application of various potentials to the selectively placed highly conductive areas, it is possible to cause a pattern of equipotential lines of various shapes to appear on the surface of the resistive material which is probed by the wiper contact. In each case where the contact engaged surface of the resistance element has non-conductive boundaries, the equipotential lines will intersect the non-conducting boundaries of the resistance element at right angles.

Since the distribution of equipotential lines can be greatly varied, it is possible to build potentiometers corresponding to different multidimensional functions $f_1$, $f_2$, $f_3$; etc. By way of example, the distribution of equipotentials for disc-like resistance element that rotates and is electrified radially would be logarithmic in a radial direction but uniform in a circumferential direction, i.e., in the direction of rotation. This is not limited to devices employing cylindrical resistance elements; the invention also extends to devices with resistance elements having other shapes, e.g., flat discs or conical or frustoconical elements, etc.

In the case of devices having cylindrical or conical resistance elements, it is preferred that the resistance element be planar and conformable to the desired shape or deposited on a planar but shape-conformable surface or substrate, e.g., a flexible conductive plastic resistive film deposited on a sheet or substrate that is made of an insulating material and can be laid flat or bent to form a cylinder or cone. However, it also is appreciated that the resistance element and/or its supporting substrate may be stiff and non-conformable to a different shape, e.g., the resistance element may be a conductive material of suitable resistivity formed as a flat rigid disk or molded as a rigid or stiff cylinder, or it may be in the form of a film or a coating deposited on a substrate in the form of a stiff or rigid disk or cylinder. Further by way of example, the resistance element could be a cermet resistance material bonded to a non-conductive base member made of glass or plastic. In all of the embodiments hereinafter described the thickness, composition and homogeneity of the resistance material are sufficiently constant for it to have a predictable uniform resistivity per unit of surface area. However, modifications of the invention may be made where some or all of the contact surface of the resistance has a non-uniform but known resistivity per unit of surface area.

Figure 2:
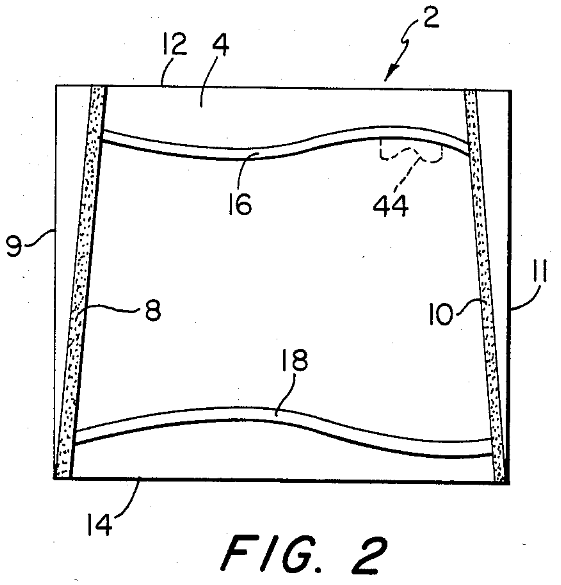

Referring now to FIGS. 1 and 2 there is shown a flat but bendable resistance card 2 which may take various forms but perferably is a molded or deposited, electrically-conductive plastic electric resistance medium 4 overlying a flexible insulating substrate 6, e.g., a resistance coating comprising particles of carbon disposed in an insulating organic binder comolded with or adhesively secured to an electrically insulating flexible sheet of a plastic like polyethylene or polypropylene or polyvinylchloride. The card is formed so that the resistance medium 4 has a substantially uniform specific electrical resistivity over its extent, i.e., its length, thickness, and breadth. The card 2 is preferably rectangular or square. In any event it is provided with two shaped flexible conductive boundaries for resistance layer 4. Strips 8 and 10 are coextensive with opposite edges and preferably, but not necessarily, are adjacent to those edges. In the illustrated case they have a straight shape and are disposed in converging relation to one another adjacent to opposite edges 9 and 11 of the card. Terminal strips 8 and 10 may be applied as conductive coatings on the resistance card or laminated thereto as preformed metal foil elements or comolded with the card as conductive metal terminal plates. In any event the terminal strips form short circuit boundaries for the effective electrical resistance coating. The card is also formed with two open circuit boundaries which may be determined by and conform to the other two edges 12 and 14 of the card but preferably are determined by two appropriately shaped cuts 16 and 18 of suitable width made in the card. As an alternative to cuts 16 and 18, the open circuit boundaries may be determined by removing the electrically resistive coating 4 from card substrate 6 along two selected areas extending between strips 8 and 10, e.g. the areas represented by cuts 16 and 18. In the case where the open circuit boundaries are determined by the edges 12 and 14, the latter may be appropriately shaped, e.g., like cuts 16 and 18, to provide a non-uniform two-dimensional voltage distribution between terminal strips 8 and 10.

Figure 3:
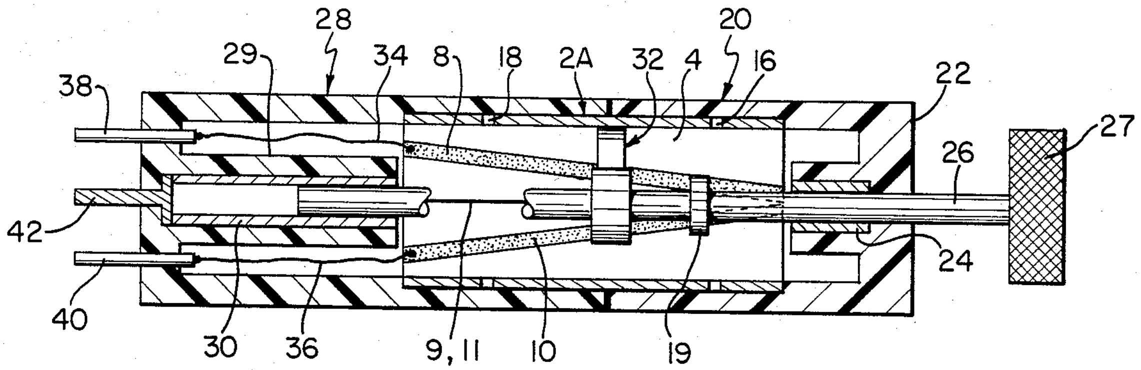
FIG. 3 is a section taken along the center axis of a two-variable function generator in the form of a rotary potentiometer using the resistance element of FIG. 2.

Referring now to FIG. 3, the card of FIGS. 1 and 2 is bent so as to form a cylindrical resistance card 2A. The edges 9 and 11 may be in butting or near butting relation and also may overlap one another (provided a short circuit does not result) and terminals strips 8 and 10 are both accessible for connection to a source of potential. Preferably the card is sized and bent so that the edges 9 and 11 butt one another and so that the card will fit snugly within a cylindrical housing 20. The latter may be made of a suitable metal, but preferably it is made of a non-conducting stiff plastic, e.g., a phenol-formaldehyde resin. One end of housing 20 has an end wall 22 with an opening in which is secured a suitable sleeve bearing 24 adapted to rotatably and slidably support an operating shaft 26. In this embodiment shaft 26 is made of an electrically conductive material. An insulated operating knob 27 may be attached to the outer end of shaft 26. A cap or end member 28 is provided which is adapted to be secured to and close off the opposite end of housing 20. End member 28 has a hollow center post 29 in which is secured a second sleeve bearing 30 for rotatably and slidably supporting the opposite end of shaft 26. Sleeve bearing 30 is made of an electrically conductive material, e.g. copper, for reasons hereinafter set forth. Shaft 26 extends coaxially with the cylindrically arranged resistance card and carries a suitable wiper arm or contact member 32 for electrically contacting the electrically conductive surface 4 of the resistance card. Wiper arm 32 is electrically coupled to shaft 26. Terminal leads 34 and 36 are connected to terminal strips 8 and 10 respectively. These leads are connected to two suitable external terminal members 38 and 40 secured in suitable holes in cap 28. The latter also carries a third external terminal member 42 which engages and makes electrical connection with sleeve bearing 30. The latter makes electrical contact with shaft 26. End member 28 is secured to housing 20 in a suitable manner, e.g., preferably by cementing it in place, or otherwise by a clamp ring (not shown) or by providing it and housing 20 with mating flanges (also not shown) that are attached to one another by screws or by bolts and nuts. In any event, shaft 26 is movable axially in bearings 24 and 30 so that wiper arm 32 can be translated along the resistance element in the region between cuts 16 and 18. At the same time shaft 26 is rotatable on its axis relative to housing 20 so that wiper arm 32 can be rotated along coating 4. Stop means (not shown) may be provided to limit rotation and axial movement of shaft 26 so as to prevent the contact member from engaging conductor strips 8 and 10 and from moving over and beyond cuts 16 and 18, e.g., axial movement may be limited by engagement of a stop 19 and knob 27 with surfaces of housing 20. The net result is that wiper arm 32 can be moved in two directions along the surface of resistance medium 4.

Assuming, for example, that the terminal strips 8 and 10 are connected to opposite sides of a fixed d.c. voltage source Vi, the voltage distribution along the expanse of conductive coating 4 will be non-uniform as a result of the orientation of elongate strips 8 and 10 and the orientation and shape of cuts 16 and 18. Hence if shaft 26 is rotated and moved axially, wiper arm 32 will pick off a voltage according to the position of wiper 32 which will vary according to the mathematical function $$V_o = V_i f(\theta, z)$$

where $\theta$ and z represent the rotational and stroked positions of wiper arm 32 relative to electrodes 8 and 10 and cuts 16 and 18, $V_i$ is the electrifying voltage provided by the voltage source, $V_o$ is the output voltage, and the function f is determined by the disposition of strips 8 and 10 and cuts 16 and 18.

A device as shown in FIG. 3 may be used for various purposes. Thus, by ganging four such units on a single shaft and appropriately shaping the pattern of equipotential lines, it is possible to provide a device which can be used for left/right and front/back balance in a 4 channel stereo playback system.

It is to be appreciated that electrodes 8 and 10 need not be straight but could be curved or made with some other shape, e.g. a saw-toothed or sinusiod shape. The exact shape of the electrodes and cuts will depend on the desired equipotential line distribution pattern, i.e., the particular function capability desired. For particular applications it may be desirable also to alter the voltage distribution by providing an electrically conductive coating shorting bar along one or more selected areas of the resistive coating 4, as for example, a shorting bar 44 shown located along a section of the open circuit boundary determined by cut 16. The effect of shorting bar 44 is to introduce a different voltage gradient locally in the region of the shorting bar.

Figure 4:
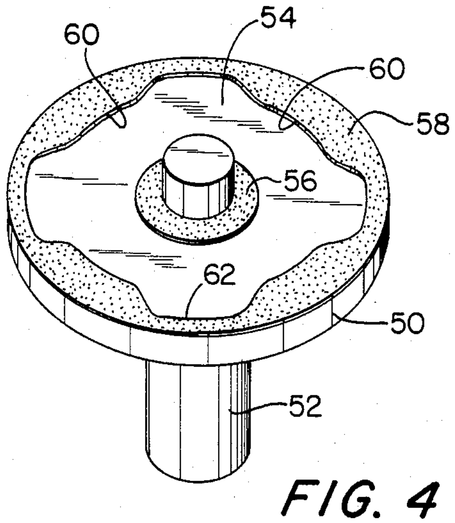
FIG. 4 is a perspective view of a resistor member subassembly of another embodiment of the invention.
Figure 5:
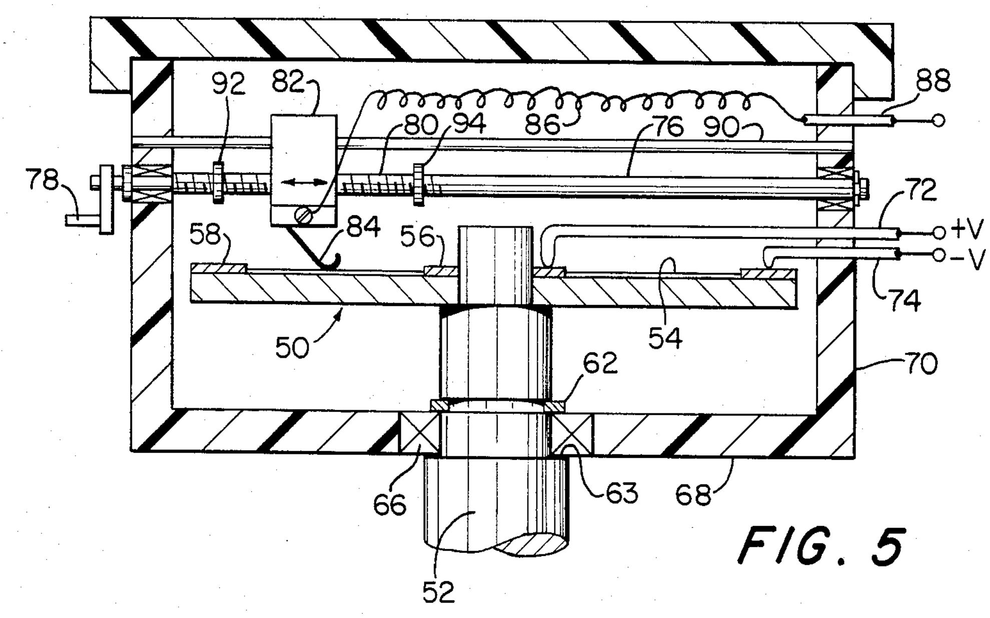
FIG. 5 is a section view in elevation of a potentiometer-type function generator incorporating the subassembly of FIG. 4.

FIGS. 4 and 5 illustrate another form of function generator made in accordance with this invention. In this case the resistance element comprises a rigid or stiff circular disk 50 of a non-conducting material such as glass or plastic which is mounted on a shaft 52 and has on one surface an adherent conductive coating 54 which has a uniform resistivity and thus functions as the resistance medium. If desired disk 50 may be made of a metal, in which case a layer of a suitable insulating material, e.g. a film of a lacquer or polyethylene is interposed between the disk and the resistance medium. Of course the latter may take various forms, e.g. it may be preformed as a sheet and bonded to the disk, or be a film which is deposited on or comolded with disk 50. The resistance element medium is provided with two short circuit boundaries in the form of two radially spaced conductive metal strips 56 and 58 overlying and bonded to the resistive coating 54. In this case the inner strip 56 has a circular outer edge, while the outer strip 58 has a circumferentially extending inner edge which is contoured in the general shape of a square-wave with lobes and recesses that have constant radius sections 60 and 62 respectively. The inner and outer edges of strips 56 and 58 respectively may be circular as shown or have any other configuration since their shapes are of no electrical importance.

FIG. 5 illustrates a function generator embodying the resistance element of FIG. 4. Shaft 52 is rotatably supported by a bearing 66 which is mounted in the end wall 68 of a cylindrical housing 70. A retaining ring 62 received in a groove in shaft 52 coacts with a shoulder 63 on the shaft to prevent it from moving axially in bearing 66 while allowing it to be rotated. Mounted in the side wall of housing 70 are two resilient conductive terminal members 72 and 74 whose inner ends are arranged to press against and make a satisfactory sliding contact with strips 56 and 58 respectively. A transversely extending shaft 76 is rotatably supported in two diametrically opposed sections of the housing side wall. Shaft 76 is shown as provided with a crank 78 whereby it may be turned, but it may be turned by a knob or even connected to a remote drive. Shaft 76 is mounted so that it can rotate but not move axially. A portion of shaft 76 is threaded as shown at 80 and a contact member carrier 82 is mounted on the shaft, the carrier having a through hole which is threaded to mate and form a screw connection with the aforesaid threaded section of the shaft. Carrier 82 is preferably made of an insulating material and affixed to it is a resilient contact member 84 that makes a sliding contact with the resistive medium 54. A conductive wire lead 86 coiled so as to be expandable in length is connected at one end to contact member 84 and at the opposite end to a terminal member 88 anchored in housing 70. A slide rod 90 with its ends anchored in the side wall of the housing extends parallel to shaft 76 and carrier 82 is provided with a through hole sized to make a close sliding fit with rod 90. As a result when shaft 76 is rotated, carrier 82 will move radially toward or away from the axis of shaft 52 according to the direction of rotation. Rod 90 prevents the carrier from rotating with shaft 76, and fixed stops 92 and 94 may be provided on shaft 76 to limit the travel of carrier 84 so that control member 84 is prevented from overriding either of strips 56 and 58. If terminal members 72 and 74 are connected to a d.c. potential source, a non-uniform voltage distribution will be produced in resistance medium 54, with the voltage gradient in the regions extending between lobes 60 and strip 56 being greater than the voltage gradient in the regions extending between recesses 62 and strips 56. Accordingly, the voltage output at terminal 88 will vary as a function of the radial and circumferential positions of contact member 84 as determined by rotation of shafts 52 and 76. In the instant case, if shaft 76 is held fixed and shaft 52 is rotated at a constant speed, the output voltage will change periodically at a constant frequency. If subsequently contact member 84 is moved to a new radial position, the output periodically varying voltage will undergo a non-uniform change in amplitude due to the different voltage gradients in the regions of lobes 60 and recesses 62, i.e. the change in amplitude of the positive going excursions of the output voltage may be greater or less than the amplitude change of the negative-going excursions. Of course, the shape of the inner edge of conductive strip 58 and/or the shape of the outer edge of strip 56 may be modified to cause the output voltage to change according to another function, e.g., the confronting edges of each strip 56 and 58 may be contoured according to a pure sinusoid or sawtooth waveform with the same or different frequencies.

A further variation of the device of FIGS. 4 and 5 is to mount shaft 76 and rod 90 so that the contact member moves along a chord instead of the radius of a circle concentric with shaft 52.

Figure 6:
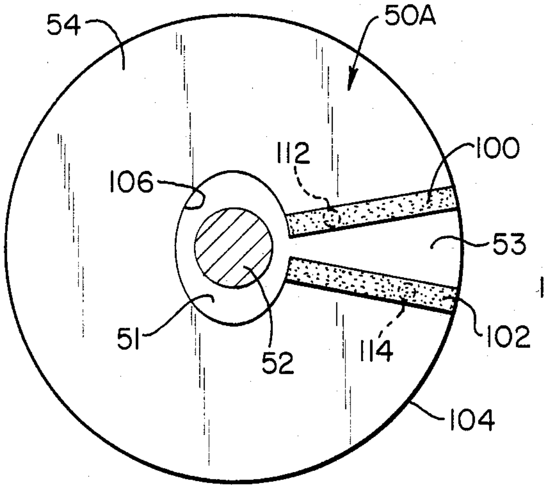
FIGS. 6 and 7 are opposite end views of another resistor member subassembly.
Figure 7:
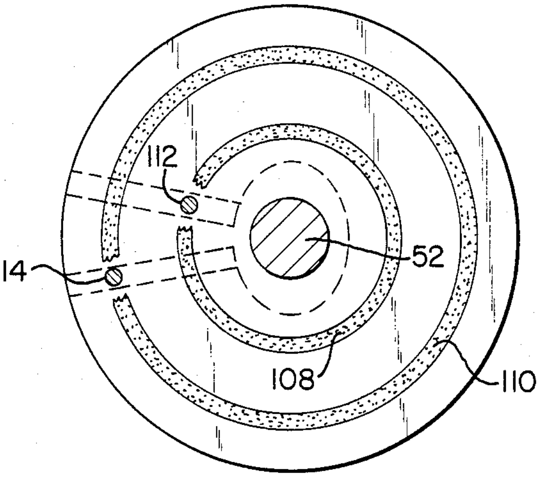

FIGS. 6 and 7 illustrate opposite sides of another resistance element made in the form of a disk. In this case a stiff disk 50A is provided which is affixed to rotatable shaft 52 and is made of an electric insulating material. The layer of resistive medium 54 overlies all of one surface of the disk except for an elliptical area 51 surrounding shaft 52 and a wedge-shaped area 53 extending from that elliptical area to the outer margin of the disk. Radially-extending conductive strips 100 and 102 are applied to the resistive medium at the margins of the wedge shaped area 53. As a result the resistive medium has two short circuit boundaries 100 and 102, an outer circular open circuit boundary 104 and an inner open circuit boundary 106. The opposite side of disk 50A is provided with two circular conductive strips 108 and 110 which are conductively connected to strips 100 and 102 respectively via metal conductors 112 and 114 embedded in the disk.

Disk 50A is intended to be used in the device of FIG. 5 in place of disk 50. For this modification the terminal members 72 and 74 are disposed so that they will engage the two concentric strips 108 and 110 on the back side of disk 50A, while contact member 84 engages resistive material 54. Stops 92 and 94 are adjusted to prevent contact members from moving beyond outer and inner open circuit boundaries 104 and 106 and additional stop means (not shown) are provided for shaft 52 to prevent engagement of strips 100 and 102 by the contact member. When energized by connecting terminal members 72 and 74 to a source of d.c. electrical potential, a non-uniform distribution of potential will exist along the length and breadth of the contact surface of resistive medium 54 and the output from terminal member 88 will vary as a function of (a) movement of contact member 84 by rotation of shaft 76 and (b) movement of disk 50A by shaft 52.

Figure 8:
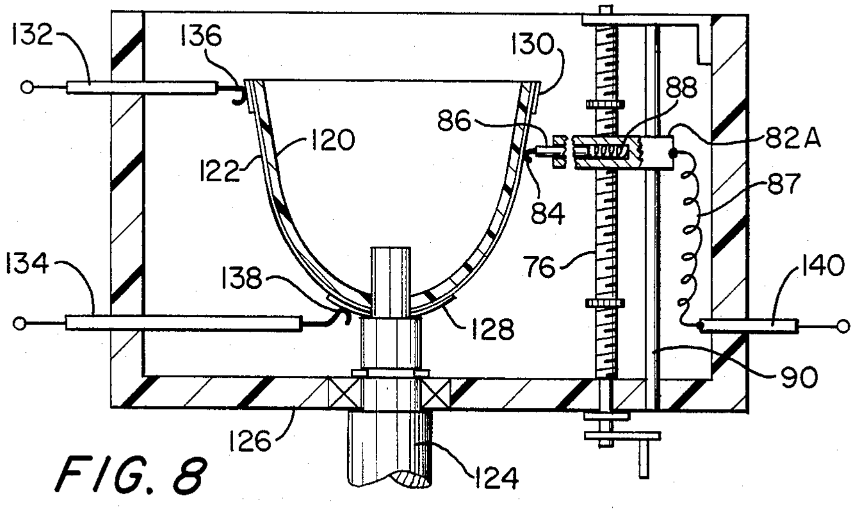
FIG. 8 is a sectional view in elevation of a function generator with a generally conically or cup-shaped resistance element.
Figure 9:
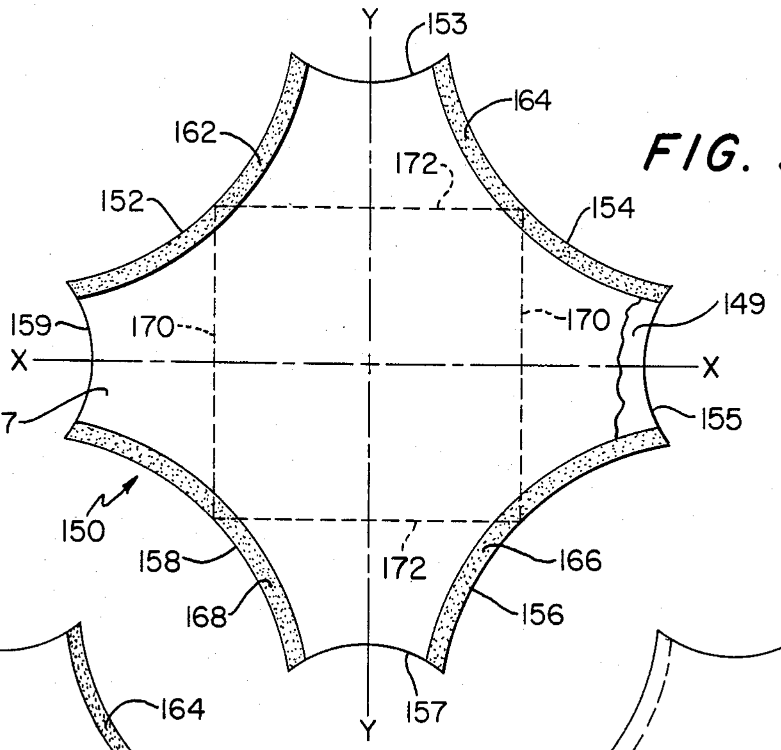
FIGS. 9–13 illustrate the formation of a resistance element for a unique two-variable multiplier made according to this invention.
Figure 10:
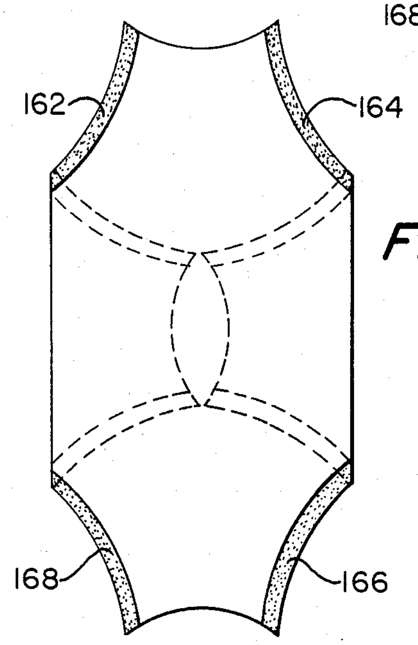
Figure 11:
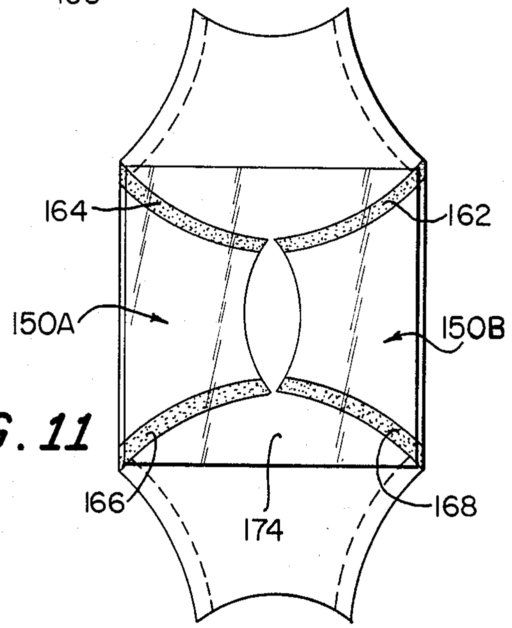

FIG. 8 is a modification of the invention which is analogous to the embodiment of FIGS. 4 and 5. In this case the resistance element is generally conical in shape and comprises an insulating material substrate 120 coated on its outside with a conductive material 122 having a selected uniform resistivity. The resistance element is mounted on and coaxial with a shaft 124 which is rotatably mounted in a housing 126 in the same manner as shaft 52. Two conductive strips 128 and 130 are formed on the resistive coating. Strip 128 is adjacent to and completely surrounds shaft 124 and the edge thereof which confronts strip 130 forms a circle. Strip 130 is located adjacent to the base of the conically shaped member and extends fully around its periphery. The edge of strip 130 confronting strip 128 is not straight but instead is contoured so that the distance between it and strip 128 varies at different locations around the periphery of the resistance element. Thus, the inner edge of strip 130 may have a contour like that of the inner edge of strip 58 in FIG. 4. Two terminal members 132 and 134 anchored in housing 126 support and are electrically connected to resilient contact members 136 and 138 that ride on strips 128 and 130. Housing 126 rotatably supports threaded shaft 76 which supports a threaded contact carrier 82A. Carrier 82A is similar to carrier 82 except that the contact member 84 is attached to a pin 86 which is slidably captivated in an elongate bore in the carrier and engaged by a compression spring 88 disposed in the same base. Spring 88 urges the pin to keep contact member 84 in contact with the resistance element as the latter turns, and the bore in the carrier is long enough to permit contact member 84 to bear against the resistance element in all positions of the carrier allowed by shaft 76. Stops 92 and 94 are fixed on shaft 76 so as to prevent the contact member from engaging conductive strips 128 and 130. A coiled conductive lead wire 87 connects contact member 84 to an output terminal member 140.

As is believed obvious, if terminals 132 and 134 are connected to a d.c. potential source, an output potential will be available at terminal 140 which will vary as a function of the position of contact member 84 lengthwise of the resistance member (as determined by operating shaft 76) and also circumferentially of the resistance member (as determined by operating shaft 124). This result is due to a non-uniform voltage distribution along the effective length and breadth of the contact surface of resistive medium 122.

FIGS. 9–13 illustrate the formation of a resistance element for a unique potentiometer type multiplier devised according to this invention. The resistance element is fabricated by providing a flat but bendable resistance card 150 having a composition like that of the resistance card 2 of FIGS. 1 and 2. Preferably it comprises a flexible electrically conductive electric resistance medium 147 formed as a film of uniform thickness and resistivity on a flexible substrate 149 made of a suitable insulating material, e.g., a film composed of carbon particles in a flexible organic insulating binder deposited on a flexible plastic sheet. In this particular embodiment of the invention, the card may be cut so that it has an 8-sided configuration disposed symmetrically with respect to selected x and y axes. Four alternately occuring sides 152, 154, 156 and 158 are curved larger than but approximately to a first set of hyperbolas ($x \cdot y = \pm k$) and the remaining sides 153, 155, 157 and 159 are curved according to a second set of hyperbolas ($x^2 - y^2 = \pm k'$). Conductive strips 162, 164, 166 and 168 are applied along the sides 152, 154, 156 and 158, so that the inner edges of the strips are curved according to the first set of hyperbolas ($x \cdot y = \pm k$). It is to be noted that only the inner edge of conductive strips 162, 164, 166 and 168 need be hyperbolic in shape. The outer edge of those conductive strips (each of sides 152, 154, 156 and 158) of the card are shaped to follow a hyperbola for convenience of illustration and construction. Thereafter as shown in FIGS. 9–13, the card is folded along two pairs of lines 170 and 172 which are parallel to and spaced from the y and x axes respectively. Preferably a protective flexible insulator sheet 174 is positioned between the folded sections 150A and 150B formed by folding along lines 170 and the folded sections 150C and 150D formed by folding along lines 172, so as to provide assurance against a short circuit between conductive strips 152 or 154 or 156 or 158, or the electrically conductive resistance medium 147.

Figure 12:
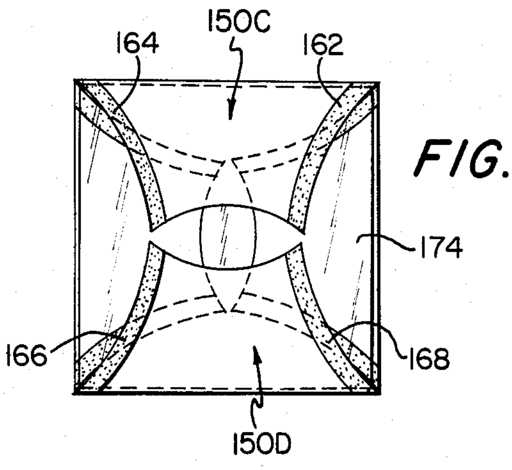
Figure 13:
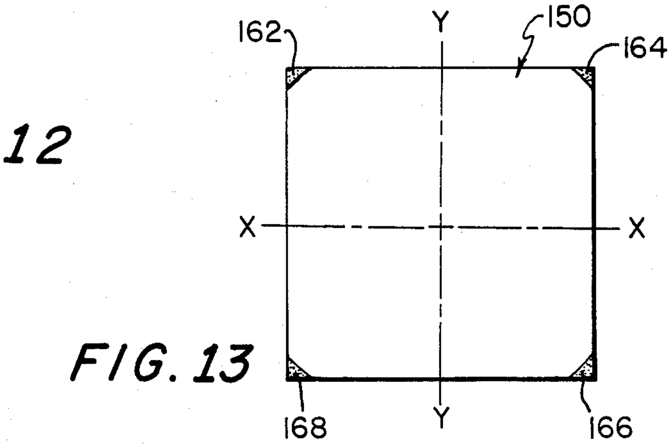

The result as shown in FIGS. 12 and 13 is a folded resistance card which has a square configuration, with one side being substantially entirely a surface of uniform resistivity and the other side having portions of all four conductive strips exposed for connection to a source of suitable electrical potential. This card may be used in flat form to make a multiplier, with a suitable contact element being mounted so as to be capable of translational movement in both the x and y directions while in sliding engagement with the surface of uniform resistivity. However, a preferred modification is to bend the card of FIGS. 12 and 13 into a cylinder and mount it within and secure it to cylindrical housing 20 of FIG. 3 so that the surface of uniform resistivity is engaged by contact member 32 and so that axis y—y extends parallel to the axis of shaft 26. The two conductive strips 162 and 166 are connected to terminal 38 leading to one (+ or −) side of a source of d.c. potential while conductive strips 164 and 168 are connected to terminal 40 leading to the other polarity (− or +) side of the same source. As a result rotational and translational movement of operating shaft 26 will produce an output voltage at terminal 42 which is representative of the value Z in the equation $$Z = X \cdot Y$$

where X and Y are functions of rotation and translation respectively of shaft 26.

Obviously the invention is susceptible of many variations and modifications. Thus, for example, in the embodiment of FIGS. 1–3, the cuts and conductive strips may be shaped otherwise than as described, depending upon the function desired. Similarly, in the embodiments of FIGS. 4 and 8 the electrodes may have a different shape. As for FIGS. 6 and 7, the outer and inner edges 104 and 106 of the resistive medium may be made with other contours and may have similar as well as different contours. The embodiment of FIGS. 9–13 also may have differently shaped edges and electrodes. Furthermore the card 150 may be formed with a different edge configuration, e.g., square or rectangular, with the electrodes 162–168 placed away from all of the edges and cuts being provided in the card along lines corresponding to edges 153, 155, 157 and 159, so that the ends of the cuts are intercepted by the ends of different electrodes. Additionally the shape of edges 153, 155, 157 and 159 and electrodes 162, 164, 166 and 168 may be varied to provide generators of other functions. A further possible modification is to mount the contact member so that it is movable along a skew line rather than a line parallel to the axis of rotation (FIG. 3) or the radius of the resistance element (FIG. 5). Still other modifications will be obvious to persons skilled in the art.

This invention has the advantages described above plus other advantages. Thus, for example, a rotary device constructed with a cylindrical resistance element as described above in connection with FIGS. 9–13 has the advantage that the operating shaft may be rotated through a full 360°. Another advantage is that in special cases portions of the resistance element may be missing or made with a different resistivity than the rest of the element. Still another advantage is that the exciting voltage may be a.c. instead of d.c. A further advantage is that a relative motion of the contact member and resistance element in two directions may be achieved by (a) merely moving the contact member or (b) moving both the contact member and resistance element. The invention also makes it possible to provide a single unit for dual mode control, e.g., a single element per channel providing both selective volume control and balance control for each of two stereo channels, or a single signaling/control unit for transmitting the position of multiple mechanical elements which collectively cause an aeroplane to pitch or climb and also turn. In this connection it is contemplated that potentiometer devices as herein described may be ganged so that they respond to one or more different functions of $\theta$ and Z, e.g. a volume/balance control system capable of responding directly to $f(\theta + Z)$ for one channel and $f(\theta - Z)$ for the other channel. A quadraphonic balance control would have four sections responding directly to $f(\theta+Z)$, $f(\theta-Z)$, $f(\theta+Z)$, and $f(-\theta-Z)$.

What is claimed is:

1. A potentiometer-type function generator comprising:

a resistance element formed of a sheet material comprising four short circuit and four open circuit boundaries with each open circuit boundary being terminated at each end by a short circuit boundary, said resistance element having a first non planar surface and a uniform known resistivity, and said open circuit and short circuit boundaries being arranged so that when said resistance element is electrified a non-uniform voltage distribution is provided along said first surface;

means for connecting some of said short circuit boundaries to a source of positive electrical potential and means for connecting others of said short circuit boundaries to a source of negative potential, so as to electrify said resistance element;

a contact member in contact with said first surface; and means for mounting said contact member and resistance element for relative movement in two directions.

2. Apparatus according to claim 1 wherein said resistance element is in the shape of a cylinder and said contact member is mounted on a rotatable shaft.

3. Apparatus according to claim 2 wherein said contact member is movable circumferentially and also lengthwise of said cylinder.

4. Apparatus according to claim 1 wherein said open circuit boundaries are curved according to a set of hyperbolas.

5. Apparatus according to claim 4 wherein said short circuit boundaries are curved according to a second set of hyperbolas.

6. Apparatus according to claim 1 wherein said resistance element has orthogonal x and y axes and two of said open circuit boundaries intersect said x axis and the other two of said open circuit boundaries intersect said y axis.

7. Apparatus according to claim 5 further wherein said resistance element is folded along first and second fold lines extending parallel to but on opposite sides of said x axis and also along third and fourth fold lines extending parallel to but on opposite sides of said y axis.

8. Apparatus according to claim 5 wherein said short circuit boundaries are conductive strips overlying and bonded to said resistance element.

9. Apparatus according to claim 6 wherein said resistance element is folded so that a selected portion of said surface constitutes a contact surface on one side of said resistance element, and portions of said conductive strips are exposed on the reverse side of said resistance element.

* * * * *